July 18, 1967 B. A. STANLEY ET AL 3,332,038

MULTICHANNEL SYSTEM COMPRISING MATCHING RESISTORS OF THE SAME ORDER OF MAGNITUDE AS THE FILTER NETWORKS TO WHICH THEY ARE COUPLED

Filed Feb. 12, 1965 2 Sheets-Sheet 1

INVENTORS
BRIAN ANTHONY STANLEY
DAVID LANGSFORD CLAY
BY Kirschstein, Kirschstein & Ottinger
ATTORNEYS July 18, 1967 B. A. STANLEY ET AL 3,332,038

MULTICHANNEL SYSTEM COMPRISING MATCHING RESISTORS OF THE SAME ORDER OF MAGNITUDE AS THE FILTER NETWORKS TO WHICH THEY ARE COUPLED

Filed Feb. 12, 1965 2 Sheets-Sheet 2

INVENTORS
BRIAN ANTHONY STANLEY
DAVID LANGSFORD CLAY
BY Kinzelstein, Kinzelstein & Oltinger
ATTORNEYS United States Patent Office 3,332,038 Patented July 18, 1967

3,332,038

MULTICHANNEL SYSTEM COMPRISING MATCHING RESISTORS OF THE SAME ORDER OF MAGNITUDE AS THE FILTER NETWORKS TO WHICH THEY ARE COUPLED

Brian Anthony Stanley and David Langsford Clay, Coventry, England, assignors to The General Electric Company Limited Filed Feb. 12, 1965, Ser. No. 432,348
Claims priority, application Great Britain, Feb. 14, 1964, 6,257/64
2 Claims. (Cl. 333—8)

Figure 1:
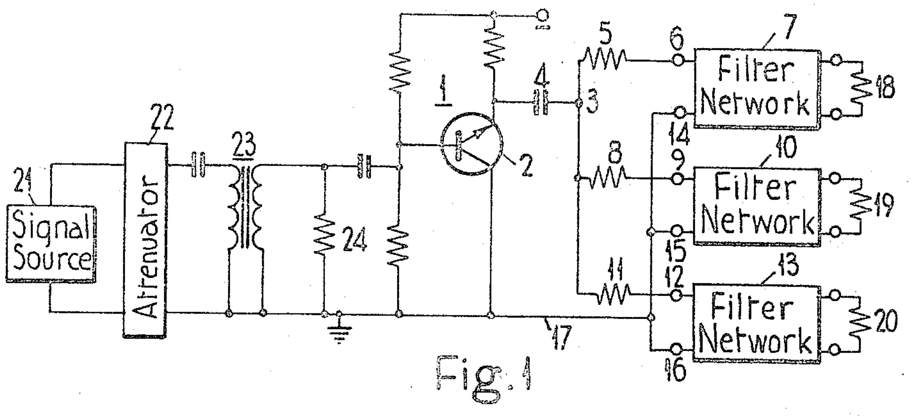

This invention relates to electric circuits for use in signalling systems.

More particularly, the invention relates to electric circuits for combining signals of different frequencies from a plurality of separate sources, or for separating a composite signal into a plurality of components of different frequencies, the circuit being of particular use in multichannel signalling systems.

In known methods of coupling circuits much emphasis has been placed on avoiding mismatch and attenuation and the networks used have accordingly been complicated in structure and difficult to design, making use of large numbers of inductors and capacitors. In the present arrangement use is made of resistors to couple a plurality of networks to an amplifier so that between any two of the networks there is interposed a T-network comprising a series resistor, the low value shunt impedance presented by the amplifier, and another series resistor. This T-network serves to minimize interaction between the networks that are coupled to the amplifier, while the attenuation of signals passing between the networks and the amplifier is counteracted by the gain of the amplifier, which may be of relatively straightforward design. Thus, acceptance of the attenuation arising from the use of resistors leads to a simple and effective coupling arrangement.

According to one aspect of the present invention an electric circuit for use in a signalling system comprises a plurality of signal supply means each of which has first and second output terminals and each of which is arranged, in operation, to supply to said output terminals oscillatory signals within a different frequency band, a like plurality of resistors, signal transmission means having first and second input terminals, means connecting the first output terminal of each of said signal supply means, by way of a respective one of said resistors, to the first input terminal of said signal transmission means, and means connecting the second output terminal of each of said signal supply means to the second input terminal of said signal transmission means which is thereby arranged, in operation, to pass signals supplied thereto by said signal supply means.

Preferably, the sum of the value of any one of the resistors and the value of the input impedance of said signal transmission means approximates to the output impedance of the signal supply means to which that one of the resistors is connected. The value of each of the resistors may be between fifteen and forty times the value of the input impedance of said signal transmission means.

According to another aspect of the present invention an electric circuit for use in a signalling system comprises a path over which, in operation, may be supplied oscillatory signals lying within a plurality of different frequency bands, signal transmission means which is connected to receive oscillatory signals from said path and which has first and second output terminals, a like plurality of resistors, a like plurality of filter networks each having first and second input terminals, means connecting the first output terminal of said signal transmission means to the first input terminal of each of said filter networks by way of a respective one of said resistors, and means connecting the second output terminal of said signal transmission means to the second input terminal of each of said filter networks.

Preferably the sum of the value of any one of the resistors and the value of the output impedance of said signal transmission means approximates to the input impedance of the filter network to which that one of the resistors is connected. The value of each of the resistors may be between fifteen and forty times the value of the output impedance of said signal transmission means.

Figure 3:
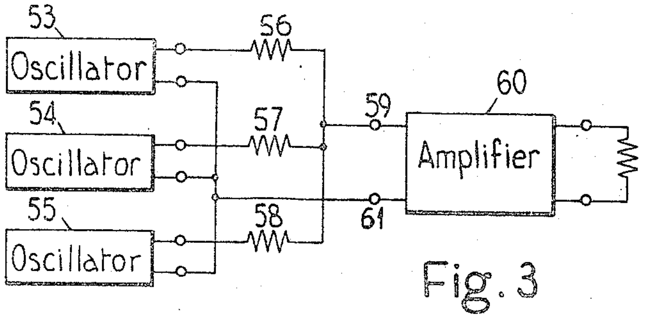
Figure 4:
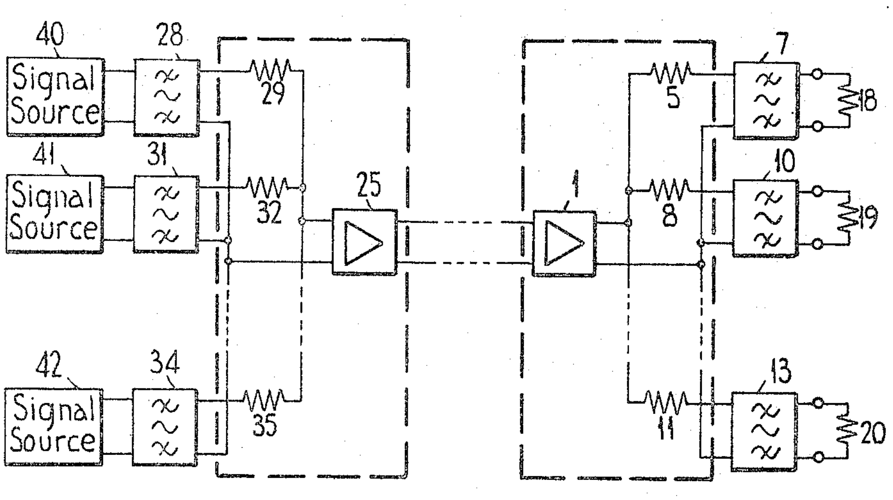
Figure 2:
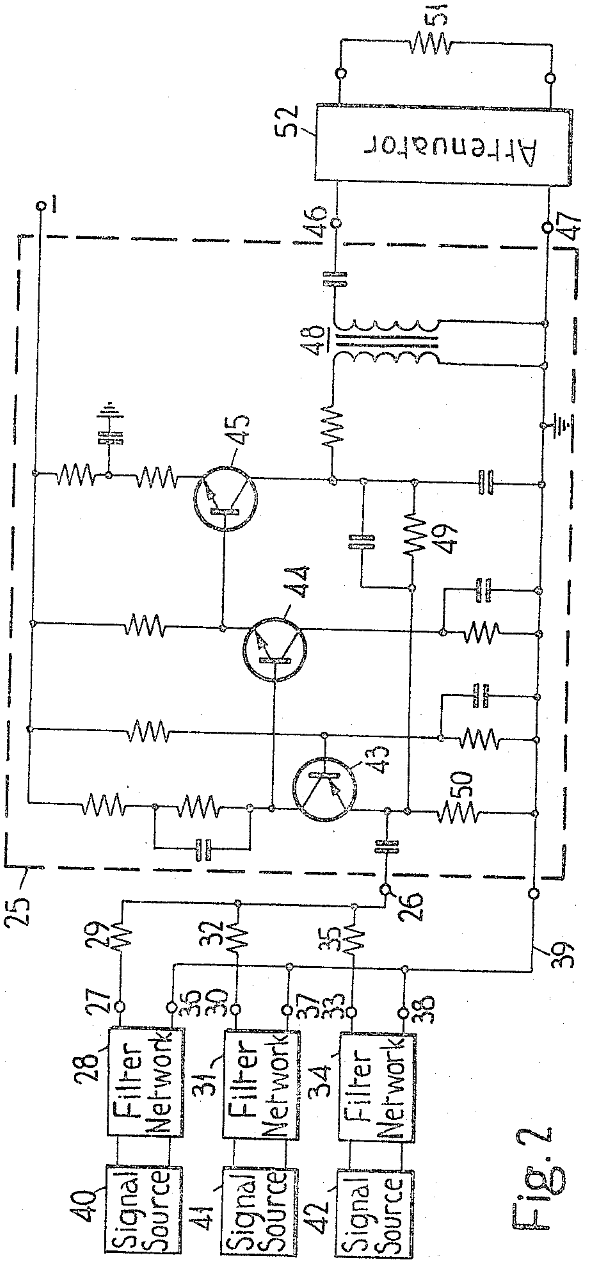

Electric circuits in accordance with the present invention will now be described by way of example with reference to the accompanying drawings, of which:

FIGURE 1 shows, partly schematically, a circuit including three filter networks coupled to a common source, FIGURE 2 shows, partly schematically, a circuit including three filter networks coupled to a common load, FIGURE 3 shows, schematically, a circuit including three oscillators coupled to a common load, and FIGURE 4 shows, schematically, a signalling system incorporating the present invention.

Referring to FIGURE 1, the circuit comprises an attenuator network 22, an input transformer 23 and an emitter follower amplifier stage 1, connected in that order, to pass oscillatory signals from a signal source 21 to the input terminals of three filter networks 7, 10 and 13, and hence to respective loads 18, 19 and 20.

The amplifier stage 1 includes an n-p-n junction transistor 2 the emitter electrode of which is connected to an output point 3 by way of a capacitor 4. The point 3 is connected by way of a resistor 5 to an input terminal 6 of the filter network 7, by way of a resistor 8 to an input terminal 9 of the filter network 10 and by way of a resistor 11 to an input terminal 12 of the filter network 13. The input terminals 14, 15 and 16 of the filter networks 7, 10 and 13 respectively are connected together and to a common line 17. The output terminals of the filter networks 7, 10 and 13 are connected to the respective loads 18, 19 and 20, respectively.

A resistor 24 is connected across the secondary winding of the transformer 23, the value of this resistor 24 in parallel with the impedance presented by the secondary winding of the transformer 23 determining the apparent source impedance for the signals applied to the input of the amplifier stage 1.

In a particular example of this circuit the signal source 21 has an output impedance of seventy-five ohms, the characteristic impedance of the attenuator network 22 is seventy-five ohms and the turns ratio of the transformer 23, primary to secondary, is one to one. The resistor 24 has a value of seventy-five ohms, so that the apparent source impedance for signals supplied to the amplifier stage 1 is approximately thirty-seven ohms. The transistor 2 has a common emitter current gain of the order of sixty and is operated at a collector current of approximately twenty milliamps, so that the output impedance of the amplifier stage 1 is of the order of two ohms. Each of the resistors 5, 8 and 11 has a value of seventy-three ohms, so that the filter networks 7, 10 and 13, which have characteristic impedances of seventy-five ohms, are correctly matched, while the input circuit of each filter 7, 10 or 13 is separated from each of the remaining filters by a T network comprising a series resistor of seventy-three ohms, a shunt impedance of approximately two ohms and another series resistor of seventy-three ohms.

It will be appreciated that other values may be chosen for the series resistors 5, 8 and 11 and for the output impedance of the amplifier stage 1, to match the impedance of any filter to be coupled to the output terminals of the amplifier 1 and to give the required degree of isolation between any one such filter and another.

Referring now to FIGURE 2, the circuit comprises a three stage amplifier 25 which is arranged to have a very low input impedance by means of negative feedback from the output of the third stage to the input of the first stage of the amplifier.

To an input terminal 26 of the amplifier 25 are connected an output terminal 27 of a filter network 28, by way of a resistor 29, an output terminal 30 of a filter network 31, by way of a resistor 32, and an output terminal 33 of a filter network 34, by way of a resistor 35. The output terminals 36, 37 and 38 of the filter networks 28, 31 and 34 respectively are connected together and to a common line 39. The input terminals of the filter networks 28, 31 and 34 are connected to receive oscillatory signals from respective signal sources 40, 41 and 42.

The amplifier 25 includes a p-n-p junction transistor 43 and two n-p-n junction transistors 44 and 45, the transistor 43 being connected in the common base configuration, the transistor 44 being connected in the common collector configuration and the transistor 45 being connected in the common emitter configuration. The collector circuit of the transistor 45 is coupled to a pair of output terminals 46 and 47 by way of an output transformer 48, and also is coupled to the input circuit of the amplifier 25 by way of resistors 49 and 50, the resistor 50 being connected between the emitter electrode of the transistor 43 and the common line 39. The output terminals 46 and 47 are connected to a load 51 by way of an adjustable attenuator network 52.

The degree of negative feedback provided by the resistors 49 and 50 in a particular example of this circuit is such that the input impedance of the common base input stage of the amplifier 25 has a value of the order of two ohms. The signal sources 40, 41 and 42 each have an output impedance of seventy-five ohms, and the filter networks 28, 31 and 34 each have a characteristic impedance of seventy-five ohms. With the values of the resistors 29, 32 and 35 at seventy-three ohms, therefore, each of the filter networks is correctly terminated, while any one of the filter networks is separated from any other by a T-network comprising a series resistor of seventy-three ohms, a shunt impedance of approximately two ohms and another series resistor of seventy-three ohms. As in the case of the circuit of FIGURE 1 these values may be adjusted to match other characteristic impedances and to obtain any required degree of isolation between the filter networks. In each case the attenuation introduced by the couplings described may be compensated for by providing greater gain in the associated amplifiers.

It will be appreciated that oscillatory signals from circuits other than filter networks may be combined in a manner similar to that described above in relation to FIGURE 2. An example of such another application is shown schematically in FIGURE 3.

Referring to FIGURE 3, an output terminal of each of three oscillators 53, 54 and 55 is connected by way of a respective one of resistors 56, 57 and 58 to an input terminal 59 of an amplifier 60, the other output terminals of the oscillators 53, 54 and 55 being connected together and to the other input terminal 61 of the amplifier 60.

The amplifier 60, which may be similar to that shown in FIGURE 2 under the reference 25, is arranged to present a low impedance between its input terminals 59 and 61, for example an impedance of two ohms, while the values of the resistors 56, 57 and 58, each taken to be in series with this input impedance, are chosen to provide a suitable load impedance for the respective one of the oscillators 53, 54 or 55. A typical value for each of the resistors 56, 57 and 58 would be seventy-three ohms, so that each oscillator would be working into a load impedance of seventy-five ohms.

The circuit of FIGURE 2 may be used at the transmitting terminal of a carrier telephony system and in that case the signal sources 40, 41 and 42 may each supply a carrier signal in respect of a group of twelve channels, the signals supplied by these sources all lying in different frequency bands, for combining as a supergroup to be passed to the transmission path (for example a radio link) which replaces the load resistor 51. Each of the signal sources 40, 41 and 42 thus comprises apparatus associated with the individual channels, modulators and filters in known manner. Similarly at the receiving terminal of the system there may be provided apparatus having the circuit of FIGURE 1, the signal source 21 of that figure being replaced by the transmission path, while the load resistors 18, 19 and 20 are replaced by receiving apparatus for handling the individual twelve-channel groups. Such a system is shown schematically in FIGURE 4 in which the same reference numerals have been used as in FIGURES 1 and 2.

In all of the circuits described above the coupling arrangements are unbalanced, although it will be appreciated that the present invention is applicable to balanced coupling arrangements. For example in the circuit shown in FIGURE 1 the connections between the common line 17 and the input terminals 14, 15 and 16 of the filter networks 7, 10 and 13 respectively may be by way of respective further resistors (not shown) and an output transformer, the two resistors then associated with each filter network being equal in value to one half of the value required in the unbalanced arrangement.

We claim:

1. An electric circuit for use in a multichannel signalling system in which the channels are combined in frequency division multiplex, said circuit combining signals from a plurality of said channels, said circuit comprising:
- (A) a plurality of circuits each adapted to carry the signals on at least one of said channels,
- (B) a like plurality of filter networks each having first and second output terminals between which terminals said filter networks respectively present characteristic impedances of a given order of magnitude,
- (C) means to couple each of said filter networks to a respective one of said plurality of circuits,
- (D) a like plurality of resistors having values of the same order of magnitude,
- (E) a wideband amplifier that is coupled to a common signal transmission path of the system and which has first and second input terminals between which said amplifier presents an impedance at least an order of magnitude lower than that of said characteristic output impedances of the filter networks,
- (F) means connecting respective ones of said resistors between the first output terminals of the filter networks and the first input terminal of the wideband amplifier, and
- (G) means connecting the second output terminals of the filter networks to the second input terminal of the wideband amplifier,
- (H) the output impedance value of each filter network between its first and second output terminals being substantially equal to the impedance value of a resistor plus the input impedance value of the wideband amplifier between its first and second input terminals.

2. An electric circuit for use in a multichannel system in which the channels are combined in frequency division multiplex, said circuit separating a combined signal into signals in a plurality of the channels, said circuit comprising:
- (A) a plurality of circuits each adapted to carry the signals on at least one of said channels,
- (B) a like plurality of filter networks each having first and second input terminals between which terminals said filter networks respectively present characteristic impedances of a given order of magnitude,
- (C) means to couple each of said filter networks to a respective one of said plurality of circuits, (D) a like plurality of resistors having values of the same order of magnitude, (E) a wideband amplifier that is coupled to a common signal transmission path of the system and which has first and second output terminals between which said amplifier presents an impedance at least an order of magnitude lower than that of said characteristic input impedances of the filter networks, (F) means connecting respective ones of said resistors between the first input terminals of the filter network and the first output terminal of the wideband amplifier, and (G) means connecting the second input terminals of the filter networks to the second output terminal of the wideband amplifier, (H) the input impedance value of each filter network between its first and second input terminals being substantially equal to the impedance value of a resistor plus the output impedance value of the wideband amplifier between its first and second output terminals.

References Cited

UNITED STATES PATENTS

| | | | |
|---|---|---|---|
| 2,757,342 | 7/1956 | Linvill | 333—8 |
| 2,768,351 | 10/1956 | Schotten et al. | 333—8 |

FOREIGN PATENTS

| | | |
|---|---|---|
| 791,823 | 10/1935 | France. |

OTHER REFERENCES

Reference Data for Radio Engineers, 4th ed., I. T. & T., 1956, p. 449 relied on.

HERMAN KARL SAALBACH, *Primary Examiner.*

P. GENSLER, *Assistant Examiner.*